(12) United States Patent
Ni

(10) Patent No.: US 8,884,205 B2
(45) Date of Patent: Nov. 11, 2014

(54) LOW CONSUMPTION MATRIX SENSOR

(75) Inventor: Yang Ni, Palaiseau (FR)

(73) Assignee: New Imaging Technologies, Evry (FR)

( * ) Notice: Subject to any disclaimer, the term of this patent is extended or adjusted under 35 U.S.C. 154(b) by 383 days.

(21) Appl. No.: 13/256,351

(22) PCT Filed: Mar. 10, 2010

(86) PCT No.: PCT/IB2010/051025
§ 371 (c)(1),
(2), (4) Date: Nov. 23, 2011

(87) PCT Pub. No.: WO2010/103464
PCT Pub. Date: Sep. 16, 2010

(65) Prior Publication Data
US 2012/0074299 A1    Mar. 29, 2012

(30) Foreign Application Priority Data

Mar. 13, 2009 (FR) ...................................... 09 51596

(51) Int. Cl.
*H04N 5/335* (2011.01)
*H01L 27/146* (2006.01)
*H04N 3/14* (2006.01)
*H04N 5/3745* (2011.01)
*H04N 5/341* (2011.01)

(52) U.S. Cl.
CPC ............... *H04N 3/155* (2013.01); *H04N 5/335* (2013.01); *H04N 5/3745* (2013.01); *H04N 5/341* (2013.01)
USPC ...................... 250/208.1; 250/214 A; 348/308

(58) Field of Classification Search
USPC .............. 250/208.1, 214 A, 214 LS, 214 SW, 250/214 R; 348/294, 300, 301, 302, 308; 257/290, 291, 292, 431, 443, 444
See application file for complete search history.

(56) References Cited

U.S. PATENT DOCUMENTS 6,542,190 B1 * 4/2003 Chin ............................. 348/308
7,170,556 B2 * 1/2007 Kokubun et al. ............. 348/241
7,220,953 B2 * 5/2007 Teo et al. ................. 250/214 R (Continued)

FOREIGN PATENT DOCUMENTS

EP    1 271 930 A2    1/2003
EP    1 354 360 B1    8/2008

(Continued)

OTHER PUBLICATIONS

Notification of Reasons for Rejection dated May 15, 2013 from Japanese Patent Application No. 2011-553584 (with English-language translation).

(Continued)

*Primary Examiner* — John Lee
(74) *Attorney, Agent, or Firm* — Oliff PLC

(57) ABSTRACT

An image matrix sensor having a plurality of individual detection structures associated with respective pixels, each individual detection structure including a photodiode having at least one solar cell mode operating range, a first amplifier stage constantly supplied with power and receiving, as an input, a voltage dependent on the voltage of the photodiode which falls within said range; and a second amplifier stage linked to the output of the first amplifier stage and supplied with power in a different manner according to whether or not the first amplifier stage is read.

17 Claims, 5 Drawing Sheets

(56) References Cited

U.S. PATENT DOCUMENTS

| | | | |
|---|---|---|---|
| 7,508,429 B2* | 3/2009 | Lim et al. | 348/241 |
| 7,876,249 B2* | 1/2011 | Ignjatovic et al. | 341/137 |
| 2003/0010896 A1* | 1/2003 | Kaifu et al. | 250/208.1 |
| 2005/0073451 A1* | 4/2005 | Bocko et al. | 341/143 |
| 2005/0280730 A1* | 12/2005 | Lim et al. | 348/308 |
| 2006/0146161 A1* | 7/2006 | Farrier | 348/308 |
| 2006/0192079 A1* | 8/2006 | Yokomichi | 250/208.1 |
| 2006/0208164 A1* | 9/2006 | Teo et al. | 250/214.1 |
| 2007/0152247 A1 | 7/2007 | Lee | |
| 2011/0025898 A1* | 2/2011 | Ni | 348/308 |
| 2012/0074299 A1* | 3/2012 | Ni | 250/208.1 |

FOREIGN PATENT DOCUMENTS

| | | |
|---|---|---|
| FR | 2 920 590 A1 | 3/2009 |
| JP | A-5-300432 | 11/1993 |
| JP | A-2000-78472 | 3/2000 |
| JP | A-2003-009003 | 1/2003 |
| JP | A-2003-9003 | 1/2003 |
| JP | A-2003-018465 | 1/2003 |
| WO | WO 02/059974 A1 | 8/2002 |

OTHER PUBLICATIONS

Mar. 13, 2009 Written Opinion issued in French Application No. 0951596 (with translation).

Oct. 9, 2009 Preliminary Search Report issued in French Application No. 0951596 (with translation).

Jun. 9, 2010 International Search Report issued in International Application No. PCT/IB2010/051025 (with translation).

Jun. 9, 2010 Written Opinion issued in International Application No. PCT/IB2010/051025 (with translation).

\* cited by examiner

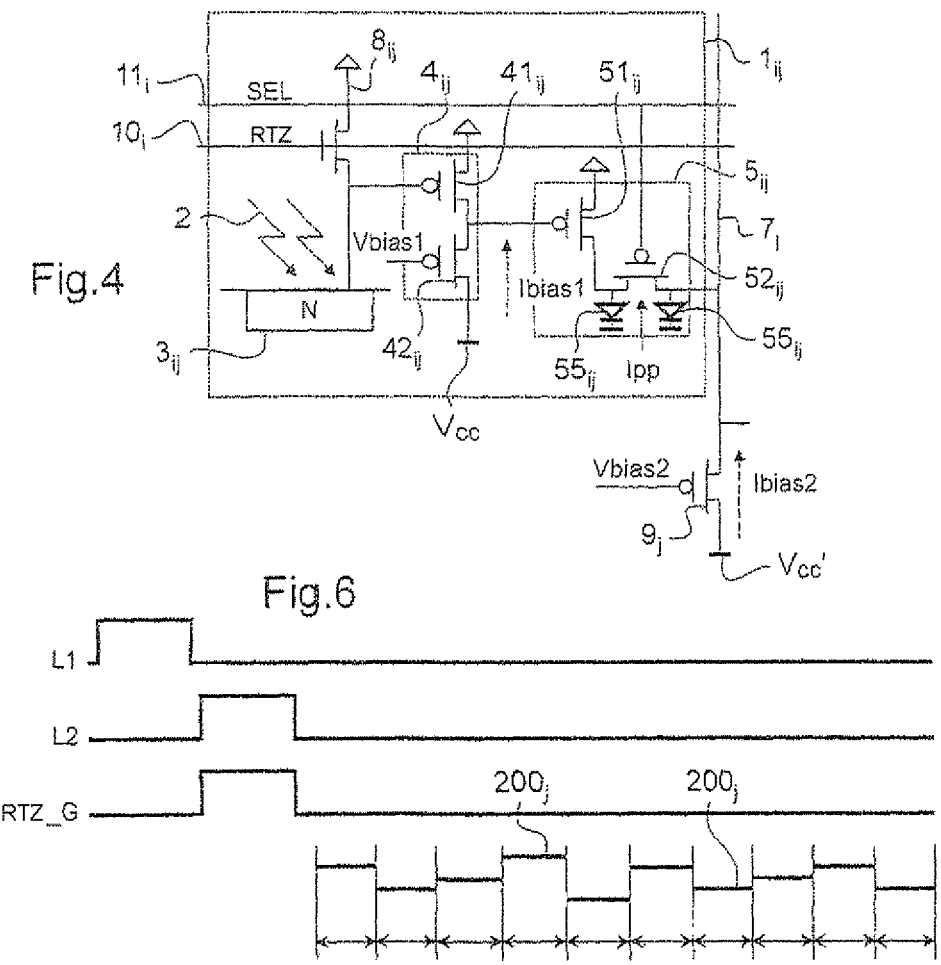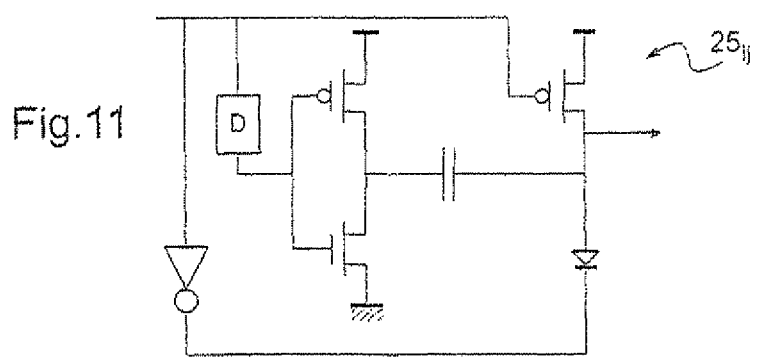

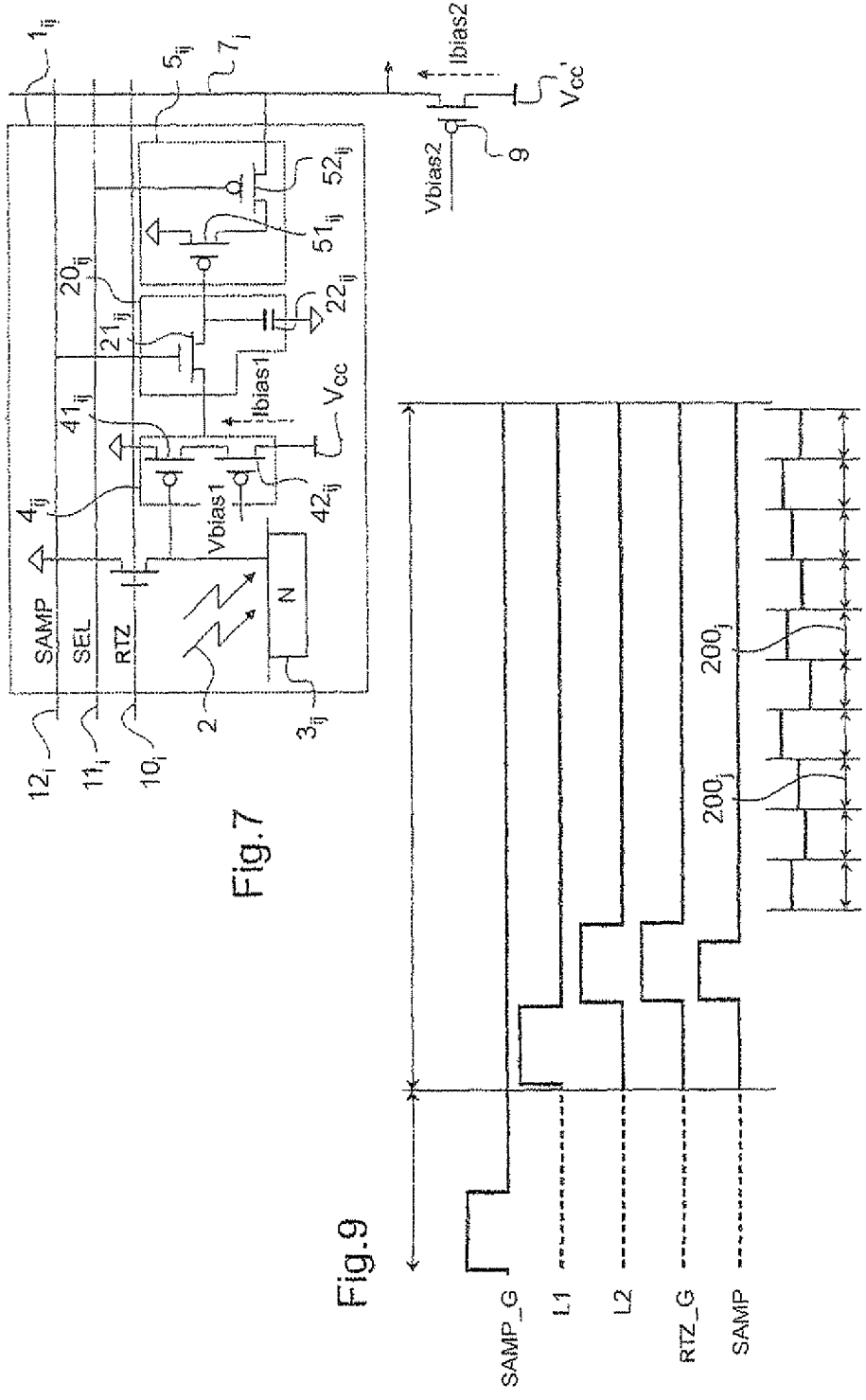

LOW CONSUMPTION MATRIX SENSOR

BACKGROUND

The present disclosure relates to a matrix image sensor comprising a plurality of individual detection structures associated with respective pixels.

The dynamic range of such a sensor is decisive in regard to preserving all the information of a scene to be observed. In the visible spectrum, the spatio-temporal distribution of the luminance may be greater than 120 dB, thus greatly exceeding the dynamic range available on a conventional image sensor.

These use a linear photoelectric conversion law whose operating dynamic range is limited at one and the same time by the maximum amplitude of the video signal and the level of the noise at the output of the sensor.

EP 1 271 930 discloses a sensor whose resolution may be modified. There is no operation in solar cell mode of the photodiodes.

Numerous solutions are known for increasing the operating dynamic range of an image sensor.

Patent EP 1 354 360 discloses for example a CMOS individual detection structure associated with a pixel having a logarithmic response and good image quality. This individual detection structure nonetheless exhibits two structural defects: heavy electrical consumption when a large number of these structures are assembled within a matrix to produce a sensor and the appearance of black columns on the image formed on the sensor in the case of strong point-wise and local illumination of the scene to be observed.

An individual detection structure $1_{ij}$ according to patent EP 1 354 360 has been represented in FIG. 1. This structure $1_{ij}$ comprises a photodiode $3_{ij}$ in photovoltaic mode (that is to say corresponding to a solar cell mode where the photodiode generates a voltage under illumination) read by an amplifier stage $4_{ij}$ with infinite continuous impedance comprising two MOS transistors $41_{ij}$ and $42_{ij}$, the output of this amplifier stage $4_{ij}$ being connected to a reading bus $7_j$ via a selection MOS transistor $6_{ij}$. This structure also comprises a switch $8_{ij}$ making it possible, when it is closed, to short-circuit the photodiode $3_{ij}$, as described in patent EP 1 354 360.

In order to guarantee the operating stability of the photodiode in photovoltaic mode, the amplifier stage $4_{ij}$ must be kept permanently operational, dynamic powering of this amplifier stage creating non-acceptable switching noise on the photodiode $3_{ij}$ which is in a state of high impedance.

When detection structures $1_{ij}$ according to FIG. 1 are assembled according to a matrix whose size is for example greater than 768×576 pixels, this being the standard TV resolution in Europe, the electrical consumption required to permanently bias the amplifier stage $4_{ij}$ of each individual detection structure $1_{ij}$ of the matrix can attain a value having prejudicial consequences in regard to the operation of the image sensor produced with the aid of such a matrix.

As represented in FIG. 2, a matrix comprising a large number of detection structures 1 can exhibit a stray capacitance 71 on the reading bus $7_j$ of significant value, and this may require a larger bias current in the amplifier stage $4_{ij}$ of each individual detection structure $1_{ij}$. This bias current is for example of the order of 1 µA, which for a matrix of 1000× 1000 pixels corresponds to a global current of 1 A. Such electrical consumption may pose difficulties with the design of the sensor and cause overheating of the microchip in which the sensor is integrated, thus increasing the dark current in the photodiodes and degrading the photoelectric performance of the sensor.

Another drawback of an image sensor produced with structures according to FIG. 1 is manifested by the risk of black columns appearing in the image formed on this sensor when the latter acquires an image of a scene in which very intense point sources of light are present, these black columns corresponding to pixels whose signal cannot be read.

As represented in 3, when a point light source is projected onto a subset of detection structures $1_{ij}$ according to FIG. 1, the light source causes the appearance of a significant photoelectric current $I_{pp}$ in the drain and the source of the selection transistor $6_{ij}$ between the output of the amplifier stage $4_{ij}$ and the reading bus, this current $I_{pp}$ corresponding to the appearance of stray photodiodes 61 between the drain of the transistor $6_{ij}$ and earth and between the source of the transistor $6_{ij}$ and earth. When this photoelectric current $I_{pp}$ is sufficiently large with respect to the bias current of the amplifier stage $4_{ij}$, no reading of any signal relating to the individual detection structure $1_{ij}$ can be performed on the reading bus $7_j$, thus causing the appearance of a black patch on the image formed. Knowing that a reading bus $7_j$ is shared by the whole set of detection structures associated with the pixels of one and the same column, this creates a black column in the image formed on the sensor.

Furthermore, the individual detection structure disclosed by patent EP 1 354 360 may also not be optimal in terms of compactness since it requires that the transistors $41_{ij}$ and $42_{ij}$ of the amplifier stage $4_{ij}$ on the one hand, and the selection transistor $6_{ij}$ be of different type, the transistors $41_{ij}$ and $42_{ij}$ of the amplifier stage $4_{ij}$ being for example P-channel MOS transistors and the selection transistor $6_{ij}$ being an N-channel MOS transistor. With a structure according to FIG. 1, the output signal from the amplifier stage $4_{ij}$ indeed exhibits too low a voltage for a P-channel MOS transistor, which might be used as selection transistor, to be able to be turned back on.

Moreover, the individual detection structure disclosed by patent EP 1 354 360 does not possess any means for storing an image. Now, progressive reading on a matrix comprising individual detection structures such as these creates a temporal shift between the start of reading and the end of reading, and this may cause deformations of objects in motion when the latter are observed by a sensor comprising such a matrix.

SUMMARY

It would be advantageous to remedy all or part of these drawbacks. This is achieved in various exemplary embodiments by virtue of a matrix image sensor comprising a plurality of detection structures associated with respective pixels, each individual detection structure comprising:
  a photodiode having at least one operating span in solar cell mode,
  a first amplifier stage powered permanently and receiving as input a voltage dependent on the voltage of the photodiode, including in said span and,
  a second amplifier stage, linked to the output of the first amplifier stage, and powered in a different manner depending on whether the output of the first amplifier stage is or is not read.

The terms "powered permanently" and "powered continuously" should be understood as being synonymous.

The term "linked" hereinabove must be understood to imply direct hookup, without any coupling capacitor or any switch, or indirect hookup, by way of a switch for example.

The photodiode operates within the sensor in photovoltaic mode, and the dynamic range of the sensor is greater than that of the conventional sensors which do not utilize the photovoltaic mode.

By virtue of one of the various exemplary embodiments, the first amplifier stage is powered permanently, so as to be kept in permanent operation, while the second amplifier stage is under dynamic bias.

Thus, the second amplifier stage can receive an item of information from the first amplifier stage only during a given period.

By virtue of another of the various exemplary embodiments, the first amplifier stage, which must be permanently powered, has only the second amplifier stage as load, thereby making it possible to deliver only a relatively weak bias current to this first amplifier stage. Furthermore, it possible for the second amplifier stage to be powered only when a reading of the output of the first amplifier stage is performed or to be powered significantly only when such a reading is performed.

Each individual detection structure comprises for example a controlled switch for selectively creating a short-circuit of the photodiode and simulating a darkness condition of the photodiode or for keeping the photodiode at a constant or variable predefined voltage, when it is closed. The power supplied to the first and second amplifier stages, also called "buffer amplifiers", corresponds for example to the dispatching of bias currents to these first and second amplifier stages.

The value of the bias current of the first amplifier stage may be less than 100 nA, lying for example between 10 and 50 nA. For a sensor comprising a matrix of 1000×1000 detection structures, this bias level generates a global consumption of only 10-50 mA, as against a consumption of the order of 1 A for the sensor according to patent EP 1354 360.

Furthermore, the second amplifier stage being biased in a dynamic manner, even a bias current of this second stage of relatively high value, does not bring about excessive global consumption for the sensor, a single row of matrix detection structures being selected during reading.

For example for a matrix of 1000×1000 detection structures, each second amplifier stage may be biased by a bias current of the order of 1 µA, this corresponding to a global consumption by the sensor of 1 mA during a row reading period. This bias level can make it possible to noticeably increase the threshold of tolerance to an over-exposure caused by point sources.

Each individual detection structure can comprise a system for storing the signal, especially the voltage, at the output of the first amplifier stage, the storage system being able to comprise a sampling switch between the first and second amplifier stages, for example a transistor, and a means for storing the signal at the output of the first amplifier stage, for example a capacitor.

The sampling switch may be a P-channel or N-channel MOS field-effect transistor.

The sampling switch can make it possible to sample the output signal of the first amplifier stage in the capacitor.

The sampling switch for each individual detection structure may be controlled simultaneously in such a way that the sampling takes place at the same instant for all the individual detection structures.

The capacitor is for example the input capacitor of the second amplifier stage.

By storing in the capacitor of the storage system the voltage provided by the photodiode at the output of the first amplifier stage it may be possible to reduce the temporal shift induced by the progressive reading and to avoid or at least attenuate the deformation of an object in motion observed with the aid of the sensor.

Such a storage system may moreover make it possible to observe, with the aid of the sensor, illuminations of short duration, originating for example from a flash lamp.

The detection structure may as a variant be devoid of any storage system such as described hereinabove, for example when the application assigned to the sensor tolerates deformations of objects in motion. The output of the first amplifier stage is for example then linked directly to the input of the second amplifier stage, and this may make it possible to obtain a more compact individual detection structure.

In one of the various exemplary embodiments, the second amplifier stage is powered only when the output of the first amplifier stage, and consequently the signal acquired by the photodiode, is read.

In another of the various exemplary embodiments, the second amplifier stage is powered according to a first bias current in the absence of reading of the output of the first amplifier and according to a second bias current during the reading of the output of the first amplifier, the first bias current being less than the second. The ratio between these first and second bias currents lies for example between 10 and 10000.

The sensor can comprise at least one transistor common to several detection structures, especially to detection structures associated with pixels of one and the same column of the matrix, this transistor being designed to bias the second amplifier stage of each of said detection structures.

The first amplifier stage can comprise at least two field-effect transistors and the second amplifier stage can comprise one field-effect selection, transistor and the field-effect transistors of the first amplifier stage may be of the same type as the field-effect selection transistor of the second amplifier stage, and this may make it possible to benefit from an individual detection structure that is simpler to manufacture.

The various exemplary embodiments make it possible for example to use transistors of the same type to produce the first and second amplifier stages. The presence in the individual detection structure of two amplifier stages, may make it possible to obtain a voltage sufficient to turn back on, through a zero-volts selection signal, a selection transistor of the same type as the other transistors of the amplifier stages.

The two field-effect transistors of the first amplifier stage and the selection transistor of the second amplifier stage are for example P-channel MOS transistors and the photodiode is for example produced with the aid of a junction comprising a P-type semi-conductor substrate on which an N-type diffusion is carried out.

When a single type of transistor is used, it is not necessary to resort to an insulation well, in contradistinction to the case in which the structure were to simultaneously comprise for example N-channel MOS and P-channel MOS transistors, thus allowing a saving of space within the individual detection structure, making it possible not to reduce the photodiode and consequently, to enhance photoelectric performance.

When the sampling switch uses a transistor of the same type as the transistors of the first and second amplifier stages, this sampling transistor can then be placed in the same well as them and be protected against a leakage of light signal.

Using a transistor of P-channel MOS type to produce the selection transistor of the second amplifier stage can allow the photoelectric current $I_{pp}$ induced in the drain and the source of the selection transistor by stray photodiodes to be directed in the same sense as the bias current, making it possible to further increase the bias current and to decrease the risk of columns of black pixels appearing in the image formed on the sensor, especially in the case of over-exposure to an intense point light source.

The first amplifier stage may be designed to exhibit an input impedance equivalent to that of a gate of a MOS transistor when it is powered permanently.

The sensor can further comprise means for performing a reading of the photodiode when the controlled switch for selectively creating a short-circuit of the photodiode or for keeping it at a predefined voltage is open and a reading of the photodiode when said switch is closed, and this may make it possible to compensate for the fixed spatial noise induced by the first and second amplifier stages.

The sensor may for example comprise a storage means for storing at least one of the two readings hereinabove.

In the various exemplary embodiments, there is a method for reading the signal acquired by an individual detection structure associated with a pixel of a matrix image sensor, the individual detection structure comprising:
- a photodiode having at least one operating span in solar cell mode,
- a first amplifier stage receiving as input a voltage dependent on the voltage of the photodiode, including in said span, and,
- a second amplifier stage, linked to the output of the first amplifier stage, in which method, the first amplifier stage is permanently powered and the power supplied to the second amplifier stage is modified depending on whether the output of the first amplifier stage is or is not read.

The powering of the first and of the second amplifier stage corresponds for example to the dispatching to these stages of a bias current.

The second amplifier stage receives for example a bias current only when the output of the first amplifier stage, and consequently the signal acquired by the photodiode, is read.

As a variant, the second amplifier stage receives a first bias current in the absence of reading of the output of the first amplifier stage and a second bias current during the reading of the output of the first amplifier stage, the first bias current being less than the second, the ratio between these first and second bias currents being for example between 10 and 10000.

Each individual detection structure can comprise a controlled switch for selectively creating a short-circuit of the photodiode and simulating a darkness condition of the photodiode or for keeping the photodiode at a constant or variable predefined voltage when it is closed, and a reading of the signal acquired by the individual detection structure when said switch is open may be performed and a reading of the signal acquired by the individual detection structure when said switch is closed may be performed.

Each individual detection structure can comprise a system for storing the signal at the output of the first amplifier stage, comprising a sampling switch and a storage means, and the method can comprise the step according to which the output signal of the first amplifier stage in the storage means is sampled, for each individual detection structure, for example. This sampling can take place at the same time for all the individual detection structures.

BRIEF DESCRIPTION OF THE SEVERAL VIEWS OF THE DRAWINGS

Various exemplary embodiments are described in detail with reference to the following figures, wherein elements having the same reference numeral designations represent like elements throughout, and in which:

FIG. 4 represents an individual detection structure according to an exemplary embodiment, FIG. 6 is a timechart representing steps during the reading of a line of an image acquired by a sensor according to FIG. 5, FIG. 7 represents an individual detection structure according to another exemplary embodiment, FIG. 9 is a timechart representing steps during the reading of an image acquired by a sensor according to FIG. 8.

DETAILED DESCRIPTION OF THE EMBODIMENT

Figure 1:
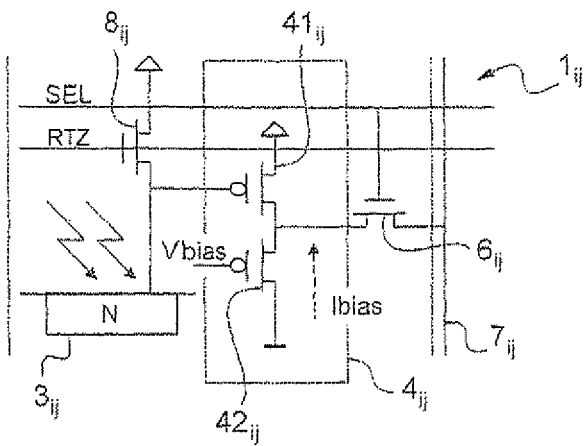
FIGS. 1 to 3 represent examples of individual detection structures according to the teaching of patent EP 1 354 360.
Figure 2:
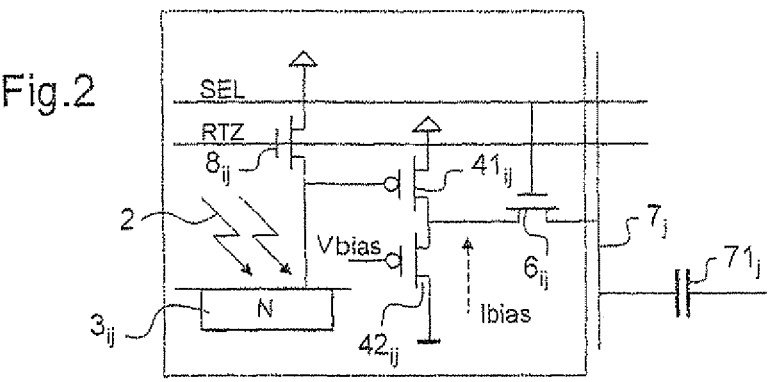

An individual detection structure $1_{ij}$ according to a first exemplary embodiment has been represented in FIG. 4.

This individual detection structure $1_{ij}$ comprises a photodiode having at least one operating span in solar cell mode, a first $4_{ij}$ and a second $5_{ij}$ amplifier stage, also called "buffer amplifiers", and a switch $8_{ij}$.

As may be seen in FIG. 4, the first amplifier stage $4_{ij}$ receives as input the voltage induced in the photodiode $3_{ij}$ when the latter is subjected to an illumination 2, including in the solar cell mode operating span of the photodiode. The output of the first amplifier stage $4_{ij}$ is received directly at the input of the second amplifier stage $5_{ij}$ and the output of this second amplifier stage $5_{ij}$ is read on a reading bus $7_j$ common to several detection structures $1_{ij}$ associated with pixels of one and the same column of a matrix comprising a plurality of detection structures.

In the example described, the photodiode $3_{ij}$ is produced with the aid of a junction comprising a P-type semi-conductor substrate on which an N-type diffusion is carried out. The junction between these two types of semi-conducting material forms a PN junction allowing photoelectric conversion.

The switch $8_{ij}$, which in the example illustrated is an N-channel MOS field-effect transistor makes it possible, as described in patent EP 1 354 360, to short-circuit or otherwise the photodiode $3_{ij}$ so as to simulate absolute darkness.

The gate of the transistor $8_{ij}$ is linked to a reset-to-zero bus $10_i$ RTZ, thereby making it possible to control the state of this switch $8_{ij}$.

The first amplifier stage $4_{ij}$ comprises in the example described two P-channel MOS field-effect transistors in series $41_{ij}$ and $42_{ij}$, powered by a voltage $V_{cc}$. A bias current $Ibias_1$ is dispatched into the first amplifier stage $4_{ij}$.

As may be seen in FIG. 4, the transistor $42_{ij}$ is linked to a voltage $Vbias_1$ which makes it possible to adjust the bias current of the first amplifier stage $4_{ij}$.

This first amplifier stage $4_{ij}$ exhibits for example a direct-current input impedance equivalent to that of a MOS transistor gate.

The second amplifier stage $5_{ij}$ comprises in the example illustrated a first and a second field-effect transistor $51_{ij}$ and $52_{ij}$ which are P-channel MOS transistors.

In the example described, the output of the first amplifier stage $4_{ij}$ is linked directly to the gate of the first transistor $51_{ij}$, without any coupling capacitor.

The transistor $52_{ij}$ plays the role of a selection transistor whose gate is linked to a control bus SEL $11_i$.

The individual detection structure $1_{ij}$ represented in 4 further comprises a load transistor $9_j$ of the second amplifier stage $5_{ij}$, situated outside the individual detection structure $1_{ij}$ and linked to a voltage source $V_{cc}'$.

The gate of this load transistor $9_j$ is linked to a voltage Vbias$_2$, making it possible to adjust the additional voltage gain that one wishes to afford to the voltage at the output of the first amplifier stage $4_{ij}$.

As may be seen in FIG. 4 a bias current Ibias$_2$ of the second amplifier stage $5_{ij}$ is dispatched to this second amplifier stage.

An example of the manner of operation of the individual detection structure $1_{ij}$ represented in FIG. 4 will now be described.

When the photodiode $3_{ij}$ is subjected to an illumination 2, a voltage is generated between the terminals of the PN junction and this voltage is read by the first amplifier stage $4_{ij}$ which is kept in permanent operation by virtue of the bias current Ibias$_1$. The first amplifier stage $4_{ij}$ being loaded only by the second amplifier stage $5_{ij}$, the bias current Ibias$_1$ has a very low value, of for example between 10 and 50 nA.

The voltage at the output of this first amplifier stage $4_{ij}$ is then received at the input of the second amplifier stage $5_{ij}$ at the level of the gate of the transistor $51_{ij}$.

The reading of the pixel associated with the individual detection structure $1_{ij}$ is performed through the second amplifier stage $5_{ij}$.

According to a first embodiment, the second amplifier stage $5_{ij}$ is biased only when the pixel with which the individual detection structure $1_j$ is associated is selected with a view to its reading. In the absence of such a selection, the bias current Ibias$_2$ is almost zero and the selection transistor $52_{ij}$ is not on.

When the pixel is selected, the selection transistor $52_{ij}$ is activated by way of the dispatching of an activation signal via the SEL bus $11_i$, and a bias current Ibias$_2$ making it possible to turn on this transistor $52_{ij}$ so as to read the pixel is dispatched to the second amplifier stage $5_{ij}$.

According to a second embodiment, the second amplifier stage $5_{ij}$ is powered by a first bias current Ibias$_2'$ when the pixel with which the individual detection structure is associated is not selected, this bias current being insufficient to turn on the transistor $52_{ij}$.

When the pixel is selected, the selection transistor $52_{ij}$ is biased by a second bias current Ibias$_2''$, allowing pixel reading and such that $$\frac{Ibias_2''}{Ibias_2'}$$

lies between 10 and 10 000.

In the example of 4, the selection transistor $52_{ij}$ and the transistors $41_{ij}$, $42_{ij}$ and $51_{ij}$ are P-channel MOS transistors. In this case, the photoelectric current $I_{pp}$ induced in the stray photodiodes $55_{ij}$ at the level of the drain and of the source of the selection transistor $52_{ij}$ is oriented in the same sense as the bias current Ibias$_2$, thereby making it possible to slightly increase this bias current.

The various exemplary embodiments are not limited to an individual detection structure such as described hereinabove.

The transistors of the first amplifier stage and the selection transistor of the second amplifier stage may be of different type, the selection transistor $52_{ij}$ being for example an N-channel MOS transistor and the transistors $41_{ij}$ and $42_{ij}$ being P-channel MOS transistors.

Figure 10:
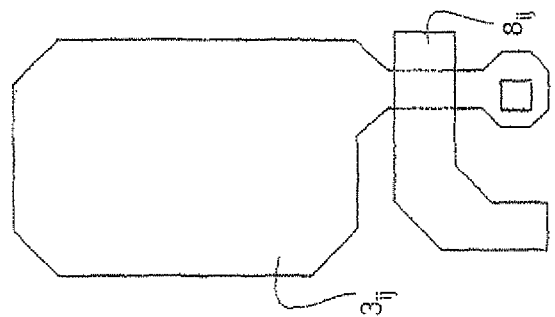
FIG. 10 represents another exemplary embodiment of a photodiode and of a switch in an individual detection structure and, FIG. 11 represents an exemplary drive circuit for a sampling switch.

As a variant furthermore, the N diffusion of the source of the transistor $8_{ij}$ may be fused with the N diffusion of the photodiode $3_{ij}$ as shown by FIG. 10.

The polarity of the photodiode $3_{ij}$ can also be inverted, the latter then being produced with the aid of an N-type semiconductor substrate on which a P-type diffusion is carried out.

The individual detection structure $1_{ij}$ can also comprise means making it possible to read a voltage of arbitrary polarity in the photodiode evolution phase during an exposure, as according to the teaching of application FR 2 920 590.

Figure 3:
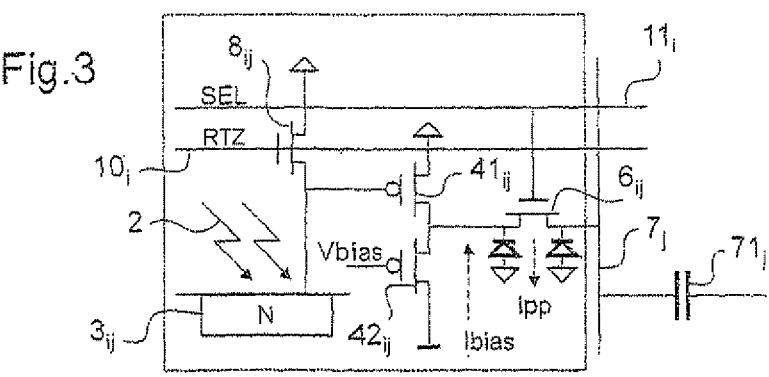

The switch $8_{ij}$ may be linked to a predefined potential, and this may make it possible, when this switch $8_{ij}$ is on, to impose on the photodiode $3_{ij}$ a predefined voltage before a snapshot. During image acquisition, the switch $8_{ij}$ is open, in such a way that the photoelectric current then induced in the illuminated photodiode $3_{ij}$ discharges this voltage progressively, in accordance with what is described with reference to FIGS. 3a and 3b of application FR 2 920 590.

Figure 5:
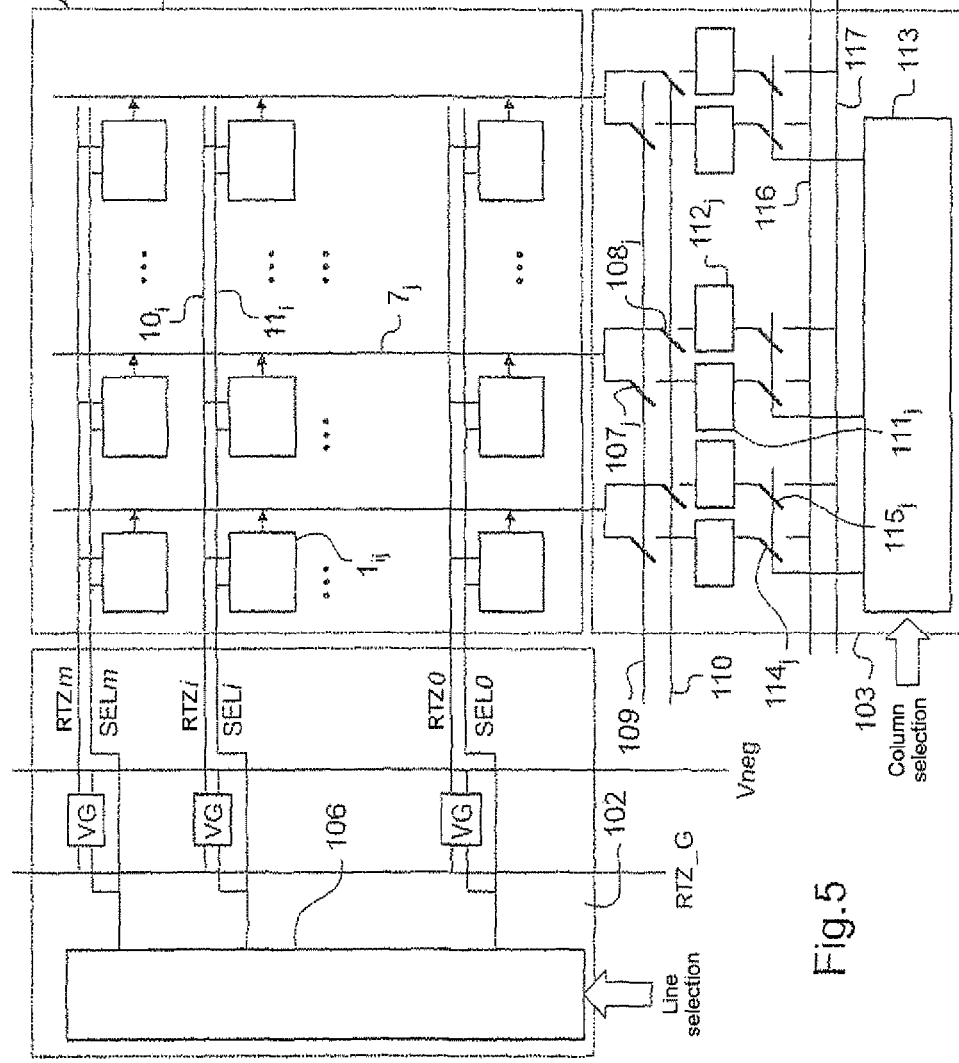
FIG. 5 represents a sensor comprising a matrix of individual detection structures according to the example of FIG. 4.

The individual detection structure $1_{ij}$ can for example comprise a capacitive coupling capacitor linking the cathode of the photodiode $3_{ij}$ and the first amplifier stage $4_{ij}$, as according to the embodiment described in FIG. 5 of application FR 2 920 590. An appropriate voltage is for example generated across the terminals of the coupling capacitor, as mentioned in FIGS. 6a to 6e of application FR 2 920 590, by linking the gate of the transistor $41_{ij}$ to a positive voltage of greater value than the threshold voltage of this transistor through a resistor of value determined so that the time constant R*C meets predefined criteria.

As a variant, this appropriate voltage may be generated across the terminals of the capacitor by using a point-wise conductivity within an electrical insulant emanating for example from an ionizing radiation, from a tunnel effect of cold electrons or else from the effect of hot electrons, as described with reference to FIGS. 7a and 7b of application FR 2 920 590.

The cathode of the photodiode $3_{ij}$ may moreover constitute one of the plates of the coupling capacitor.

An exemplary image sensor 100 comprising a matrix 101 of M+1 rows and N+1 columns of detection structures $1_{ij}$ according to the example of FIG. 4 and the reading of a line i of an image acquired by such a sensor will now be described with reference to FIGS. 5 and 6, the complete reading of the image being able to comprise a successive reading of each line.

According to the example described, the sensor 100 further comprises also:
  a line selection circuit 102,
  a circuit 103 allowing the reading of the photodiode $3_{ij}$ of each individual detection structure $1_{ij}$, when the switch $8_{ij}$ is open, and when the switch $8_{ij}$ closed and the storage of the information read and,
  a differentiation circuit 104 whose output corresponds to an image output of the sensor.

The line selection circuit 102 comprises, as may be seen, a shift register 106 and it is designed to control the activation of the RTZ bus $10_i$ and SEL bus $11_i$ which are specific to each row i of the matrix 101.

Each individual detection structure $1_{ij}$ of the matrix is linked to the buses $10_i$ and $11_i$. The detection structures $1_{ij}$ of one and the same column j of the matrix share one and the same reading bus $7_j$ as well as one and the same load transistor $52_j$ of the second amplifier stages $5_{ij}$, the load transistors $52_j$ not being represented in FIG. 5.

As may be seen, each reading bus $7_j$ is linked to two switches mounted in parallel $107_j$ and $108_j$ of the circuit 103, these switches being controlled respectively by buses 109 and 110. The other end of these switches $107_j$, respectively $108_j$, is linked to a first analog memory $111_j$, respectively to a second analog memory $112_j$.

When the signal "L1" represented in FIG. 6 is activated, the whole set of switches $107_j$ is turned on, in such a way that an image of the voltage across the terminals of the photodiode $3_{ij}$ of an individual detection structure $1_{ij}$ when the switch $8_{ij}$ is open is recorded in each memory $111_j$, this recorded value corresponding to the signal acquired by the photodiode $3_{ij}$ and to the fixed spatial noise at output, as described in patent EP 1 354 360.

When the signal "L2" represented in FIG. 6 is activated, the whole set of switches $108_j$ is turned on, in such a way that an image of the voltage across the terminals of the photodiode $3_{ij}$ of an individual detection structure $1_{ij}$ when the switch $8_{ij}$ is closed is recorded in each memory $112_j$, the latter recorded value corresponding to the fixed spatial noise alone.

The circuit 103 further comprises a shift register 113 and switches $114_j$ and $115_j$, linked respectively to the analog memories $111_j$ and $112_j$ and which, when they are on, make it possible to read according to step $200_j$ on two buses 116 and 117 the content of the memories $111_j$ and $112_j$ associated with one and the same column j of pixels. The switches $114_j$ and $115_j$ are controlled by the shift register 113.

The two buses 116 and 117 are received at the input of the differentiation circuit 104 which in this example is a differential amplifier.

The difference performed by the circuit 104 makes it possible to obtain an output signal devoid of fixed spatial noise.

Figure 8:
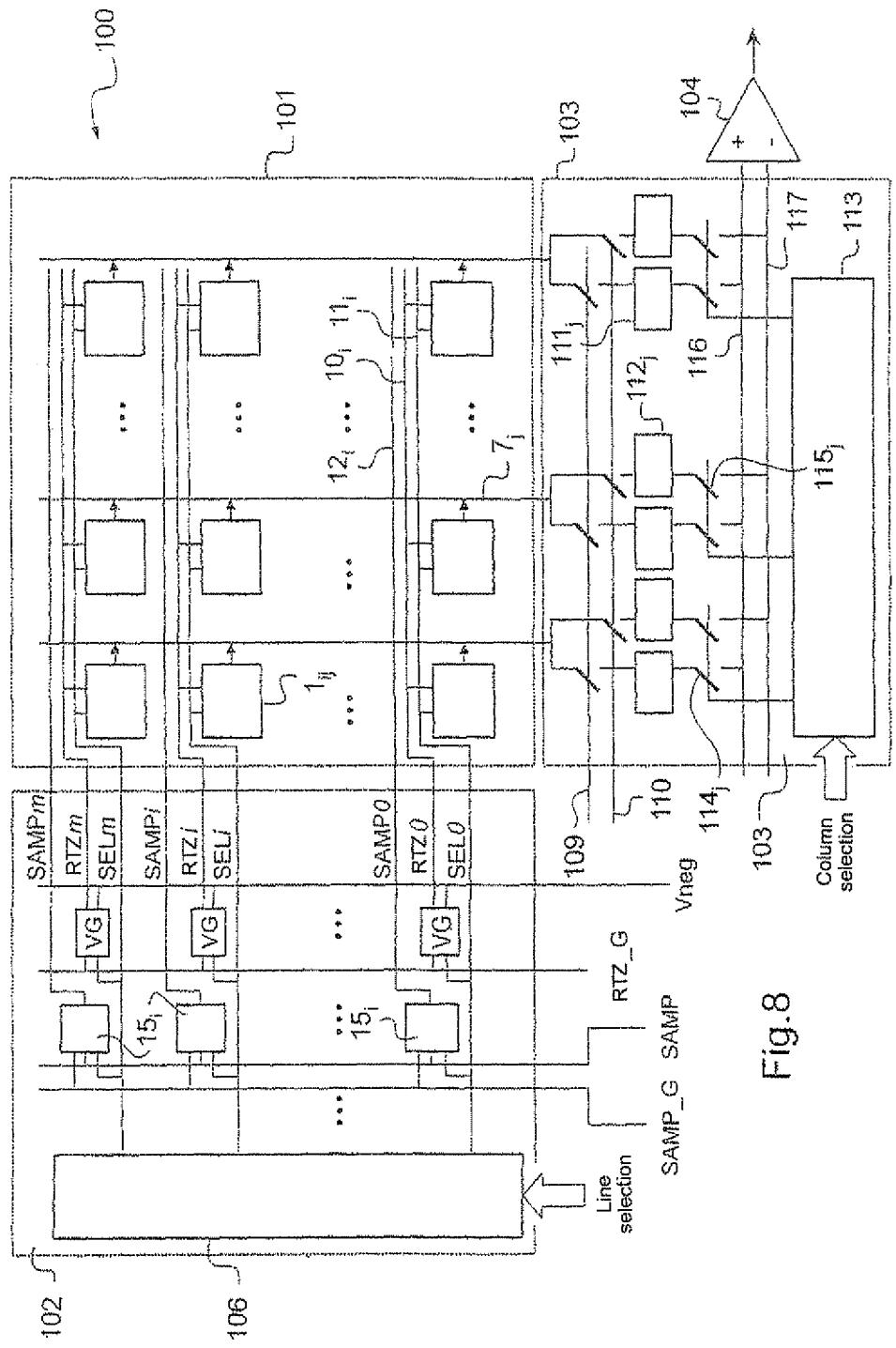
FIG. 8 represents a sensor comprising a matrix of individual detection structures according to the example of FIG. 7.

FIGS. 7 to 9 pertain to another of the various exemplary embodiments differing from that described with reference to FIGS. 4 to 6 by the fact that each individual detection structure $1_{ij}$ comprises a system $20_{ij}$ for storing the signal at the output of the first amplifier stage $4_{ij}$.

The storage system $20_{ij}$ makes it possible, in the example described, to store the voltage at the output of the first amplifier stage $4_{ij}$ and comprises a sampling switch $21_{ij}$, disposed between the output of the first amplifier stage $4_{ij}$ and the input of the second amplifier stage $5_{ij}$, and a capacitor $22_{ij}$.

In the example described, the sampling switch $21_{ij}$ is an N-channel MOS field-effect transistor, being of different type from the MOS transistors of the first and second amplifier stages. The gate of this transistor $21_{ij}$ is linked to a bus SAMP $12_i$ controlling the sampling in the capacitor $22_{ij}$ of the voltage value at the output of the first amplifier stage $4_{ij}$ and the drain and the source of this transistor $21_{ij}$ are linked to the output of the first amplifier stage $4_{ij}$ and to the input of the second amplifier stage $5_{ij}$.

The capacitor $22_{ij}$ comprises for example of the input capacitor of the second amplifier stage $5_{ij}$.

The sensor 100 represented in FIG. 8 differs from that represented in FIG. 5 by the use of components $15_i$ designed to carry out a logical combination between an output of the shift register 106 and the signals SAMP and SAMP_G so as activate via a several buses SAMP $12_i$ the sampling:
either from among a line of pixels selected by the shift register 106
or on the whole set of pixels in the matrix,
that is to say according to the logic equation:

$$SAMPi = SAMP * SELi + SAMP\_G$$

where * and + designate the logic operations "and" and "or".

As may be seen in FIG. 9, during the reading of an image acquired by a sensor comprising individual detection structures according to FIG. 7, the sampling in the capacitors $22_{ij}$ of the storage system $20_{ij}$ of each structure $1_{ij}$ of the signal at the output of the first amplifier stage $4_{ij}$ of said structure $1_{ij}$ is undertaken prior to the reading of the images at the output of the individual detection structures $1_{ij}$, thereby corresponding to the activation of the signal SAMP.

The various exemplary embodiments are not limited to the examples which have just been described.

In a variant, the first and second memories $111_j$ and $112_j$ may be replaced with analog/digital converters to the output of which are connected digital memories.

The sampling transistor $21_{ij}$ of each individual detection structure $1_{ij}$ may be a P-channel MOS transistor. In this case and when the transistors $41_{ij}$, $42_{ij}$, $51_{ij}$ and $52_{ij}$ are also P-channel MOS transistors, the sampling transistor $21_{ij}$ may be placed in the same well as these transistors and be protected against a signal leakage by light.

Still according to this example, the sampling transistor $21_{ij}$ is not controlled by a signal SAMP activated at zero volts but through a drive circuit $25_{ij}$ capable of delivering a negative voltage, an exemplary embodiment of which has been represented in FIG. 11.

Whether the transistor $21_{ij}$ be a P-channel or N-channel MOS transistor, it may be protected by a metallic layer against light Other various exemplary embodiments are possible.

The invention claimed is:

1. A matrix image sensor including a plurality of individual detection structures associated with respective pixels, each individual detection structure comprising:
    a photodiode having at least one operating span in solar cell mode,
    a controlled switch for selectively creating a short-circuit of the photodiode and simulating a darkness condition of the photodiode,
    a first amplifier stage powered permanently and receiving as input a voltage dependent on a voltage of the photodiode, including in said operating span in solar cell mode of the photodiode, and,
    a second amplifier stage, linked to the output of the first amplifier stage, and powered in a different manner depending on whether the output of the first amplifier stage is or is not read.

2. The sensor as claimed in claim 1, the second amplifier stage being powered only when the output of the first amplifier stage is read.

3. The sensor as claimed in claim 1, the first amplifier stage being powered permanently by a bias current of less than 100 nA.

4. The sensor as claimed in claim 1, the first amplifier stage comprising at least two field-effect transistors and the second amplifier stage comprising a selection transistor, the transistors of the first amplifier stage and the selection transistor being of the same type.

5. The sensor as claimed in claim 4, the two field-effect transistors of the first amplifier stage and the selection transistor of the second amplifier stage being P-channel MOS transistors and the photodiode being produced with the aid of a junction comprising a P-type semi-conductor substrate on which an N-type diffusion is carried out.

6. The sensor as claimed in claim 1, the first amplifier stage being designed to exhibit an input impedance equivalent to that of a gate of a MOS transistor when it is powered permanently.

7. The sensor as claimed in claim 1, each individual detection structure further comprising a system for storing the signal, at the output of the first amplifier stage, the storage system comprising a sampling switch disposed between the first and second amplifier stages and a storage device that stores the signal at the output of the first amplifier stage.

8. The sensor as claimed in claim 7, the sampling switch being a MOS field-effect transistor and the storage device being a capacitor.

9. The sensor as claimed in claim 1, further comprising means for performing a reading of the photodiode, switch open, and a reading of the photodiode, switch closed.

10. The sensor as claimed in claim 9, further comprising a storage device that stores at least one of the two readings.

11. A method for reading the signal acquired by an individual detection structure associated with a pixel of a matrix image sensor, the individual detection structure comprising:
- a photodiode having at least one operating span in solar cell mode,
- a controlled switch for selectively creating a short-circuit of the photodiode and simulating a darkness condition of the photodiode,
- a first amplifier stage receiving as input a voltage dependent on a voltage of the photodiode, including in said operating span in solar cell mode of the photodiode, and,
- a second amplifier stage, linked to the output of the first amplifier stage, in which method, the first amplifier stage is permanently powered and the power supplied to the second amplifier stage is modified depending on whether the output of the first amplifier stage is or is not read.

12. The method as claimed in claim 11, wherein the controlled switch further for keeping the photodiode at a constant or variable predefined voltage when it is closed and wherein a reading of the signal acquired by the individual detection structure is performed when said switch is open and a reading of the signal acquired by the individual detection structure is performed when said switch is closed.

13. The sensor as claimed in claim 3, the bias current lying between 10 and 50 nA.

14. A matrix image sensor including a plurality of individual detection structures associated with respective pixels, each individual detection structure comprising:
- a photodiode having at least one operating span in solar cell mode,
- a first amplifier stage powered permanently and receiving as input a voltage dependent on a voltage of the photodiode, including in said operating span in solar cell mode of the photodiode, and,
- a second amplifier stage, linked to the output of the first amplifier stage, and powered in a different manner depending on whether the output of the first amplifier stage is or is not read,
- the second amplifier stage comprising a load transistor situated outside the individual detection structure.

15. A matrix image sensor including a plurality of individual detection structures associated with respective pixels, each individual detection structure comprising:
- a photodiode having at least one operating span in solar cell mode,
- a first amplifier stage powered permanently and receiving as input a voltage induced in the photodiode, including in said operating span in solar cell mode of the photodiode, and
- a second amplifier stage, linked to the output of the first amplifier stage, and powered in a different manner depending on whether the output of the first amplifier stage is or is not read.

16. A method for reading the signal acquired by an individual detection structure associated with a pixel of a matrix image sensor, the individual detection structure comprising:
- a photodiode having at least one operating span in solar cell mode,
- a first amplifier stage receiving as input a voltage dependent on a voltage of the photodiode, including in said operating span in solar cell mode of the photodiode, and,
- a second amplifier stage, linked to the output of the first amplifier stage, in which method, the first amplifier stage is permanently powered and the power supplied to the second amplifier stage is modified depending on whether the output of the first amplifier stage is or is not read, and
the second amplifier stage comprises a load transistor situated outside the individual detection structure.

17. A method for reading the signal acquired by an individual detection structure associated with a pixel of a matrix image sensor, the individual detection structure comprising:
- a photodiode having at least one operating span in solar cell mode,
- a first amplifier stage receiving as input a voltage induced in the photodiode, including in said operating span in solar cell mode of the photodiode, and,
- a second amplifier stage, linked to the output of the first amplifier stage, in which method, the first amplifier stage is permanently powered and the power supplied to the second amplifier stage is modified depending on whether the output of the first amplifier stage is or is not read.

* * * * *